United States Patent
Ko et al.

(10) Patent No.: US 11,481,201 B2
(45) Date of Patent: Oct. 25, 2022

(54) INTEGRATED DEVELOPMENT ENVIRONMENT FOR DEVELOPING AND COMPILING QUERY LANGUAGE SCHEMAS FOR APPLICATION PROGRAM INTERFACES

(71) Applicant: Intuit Inc., Mountain View, CA (US)

(72) Inventors: Samuel Songhea Ko, San Diego, CA (US); Bhavin Navin Shah, San Diego, CA (US); Houssam Fathallah, San Diego, CA (US); Ashpak Salim Shaikh, San Deigo, CA (US); Varadarajan Sriram, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 154 days.

(21) Appl. No.: 16/809,993

(22) Filed: Mar. 5, 2020

(65) Prior Publication Data
US 2021/0279045 A1   Sep. 9, 2021

(51) Int. Cl.
*G06F 8/41* (2018.01)
*G06F 8/33* (2018.01)
*G06F 9/445* (2018.01)
*G06F 8/54* (2018.01)

(52) U.S. Cl.
CPC ............... *G06F 8/48* (2013.01); *G06F 8/33* (2013.01); *G06F 8/425* (2013.01); *G06F 8/427* (2013.01); *G06F 8/54* (2013.01); *G06F 9/44589* (2013.01)

(58) Field of Classification Search
CPC .. G06F 8/33; G06F 8/40–437; G06F 8/48–49; G06F 8/54; G06F 9/44589
See application file for complete search history.

(56) References Cited

U.S. PATENT DOCUMENTS

| | | | | |
|---|---|---|---|---|
| 5,182,806 A * | 1/1993 | McKeeman | ............... | G06F 8/48 714/38.1 |
| 5,193,191 A * | 3/1993 | McKeeman | ............... | G06F 8/71 717/162 |
| 6,182,281 B1 * | 1/2001 | Nackman | .................. | G06F 8/48 717/143 |
| 6,728,951 B1 * | 4/2004 | Gibson | ..................... | G06F 8/71 717/111 |
| 8,402,435 B1 * | 3/2013 | Spiro | ........................ | G06F 8/70 717/120 |
| 9,489,418 B2 * | 11/2016 | Brodsky | ............. | G06F 16/2423 |

(Continued)

OTHER PUBLICATIONS

Aho et al., "Compilers Principles, Techniques, & Tools", Second Edition, published by Pearson Addison Wesley, ISBN 0-321-48681-1, pp. 1-1035 (Year: 2007).*

(Continued)

*Primary Examiner* — S. Sough
*Assistant Examiner* — Zheng Wei
(74) *Attorney, Agent, or Firm* — DLA Piper LLP (US)

(57) ABSTRACT

An integrated development environment (IDE) system that may provide runtime validation, and incremental compilation and linking of multiple schema resources for a query language such as e.g., GraphQL. The runtime validation may be performed during the incremental compilation and linking process. If errors in the source code are detected during the runtime validation process, the compilation and linking process may be stopped without generating runtime objects.

20 Claims, 6 Drawing Sheets

(56) References Cited

U.S. PATENT DOCUMENTS

| | | | | |
|---|---|---|---|---|
| 2004/0194072 | A1* | 9/2004 | Venter | G06F 8/427 |
| | | | | 717/114 |
| 2009/0222799 | A1* | 9/2009 | Stewart | G06F 8/427 |
| | | | | 717/143 |
| 2014/0258998 | A1* | 9/2014 | Adl-Tabatabai | G06F 8/443 |
| | | | | 717/158 |
| 2017/0329584 | A1* | 11/2017 | Tabaru | G06F 8/315 |

OTHER PUBLICATIONS

Vajk et al., "Incremental Type Checking in OCL Compilers", published by IEEE, 2009 First IEEE Eastern European Conference on the Engineering of Computer Based Systems, pp. 1-18 (Year: 2009).*

\* cited by examiner

```
input DirectiveInput {
    p1: String
    p2: Boolean
}
enum SomeEnum { ENUMV1, ENUMV2 } directive @merge(if: Boolean = true) on FIELD type Query {
    pets: [Pet]
    pet(id: Int!): Pet
} type Mutation {
    addPet(pet: InputPet!): Pet
} enum AnimalType {
    DOG
    CAT
    RABBIT
} type Pet {
    id: ID!
    name: String!
    age: Int
    weight: Weight
    purebred: Boolean
    type: A
} input Input {
    id: ID!
    name:
    age: In
    weight:
    purebre
    tag: St
} directive @ type Extern
    argumentName: String
    mapping: String
}
```

500

502 — Content Assist

504

506 — EnumTypeDefinition AnimalType

- AccountType
- AddressComponentType
- AddressType
- AgeOfCreditHistoryType
- AggregatePaymentHistoryType
- Amount
- AnimalType
- !
- ,
- @
- }

Press 'F2' for focus

FIG. 5

```
input DirectiveInput {
    p1: String
    p2: Boolean
}
enum SomeEnum { ENUMV1, ENUMV2 } directive @merge(if: Boolean = true) on FIELD type Query {
    pets: [Pet]
    pet(id: Int!): Pet
} type Mutation {
    addPet(pet: InputPet!): Pet
} enum AnimalType {
    DOG
    CAT
    RABBIT
} type Pet {
    id: ID!
    name: String!
    age: Int
    weight: Weight
    purebred: Boolean
    type: Animal
}
    [x] Couldn't resolve reference to TypeDefinition 'Animal'.

input Input {
    id: ID!
    name: String!
    age: Int
    weight: Weight
    purebred: Boolean
    tag: String
} directive @fetch(field: String, arguments: [ExternalKeyMapping]) on FIELD_DEFINITION type ExternalKeyMapping {
    argumentName: String
    mapping: String
} scalar Weight
```

600

602

604 compile-time errors shown by the IDE

INTEGRATED DEVELOPMENT ENVIRONMENT FOR DEVELOPING AND COMPILING QUERY LANGUAGE SCHEMAS FOR APPLICATION PROGRAM INTERFACES

BACKGROUND

It is known in that art that application programming interfaces (APIs) expose various routines and methods to software developers for use in obtaining and modifying data when using features of a software application. APIs may be accessible programmatically (e.g., as function calls in an application or function library) or via a web-service for web-based applications. Web-based applications can invoke functionality exposed by an API, for example, using a GraphQL schema. GraphQL is, among other things, a query language that allows clients to define the structure of the data required, and the same structure of the data is returned from the server, therefore preventing excessively large amounts of data from being returned. Today, a GraphQL specification is available to ensure that developers and programmers adhere to a common vocabulary and best practices for the community's use of the GraphQL language and features.

GraphQL, however, is not without its shortcomings. For example, an end user building GraphQL schemas may want its compiler to fail and force the user to fix programming errors that would otherwise cause the executable to function incorrectly at runtime. The GraphQL specification does not allow extending an object type that does not exist in the graph. At compile time, this should result in an error that should be fixed before an artifact is generated. Today's GraphQL development systems, however, often extend an object type that does not exist in the graph because it is assumed that the object type will be provided at runtime. Thus, in this scenario, the schema will be valid at compile-time, but will fail at runtime if the extended type does not exist—this is undesirable. Accordingly, there is a need and desire for compile-time validation and other tooling for end users building GraphQL schemas.

Moreover, there is a general need and desire for a capable integrated development environment (IDE) that may provide incremental compilation and linking as well as other tools necessary to develop GraphQL schemas.

DETAILED DESCRIPTION OF SEVERAL EMBODIMENTS

Embodiments described herein may provide compile-time validation, which does not create artifacts when there are compilation errors. One or more embodiments described herein may provide incremental compilation and linking of multiple schema resources. Incremental compilation and linking may result in a reduction of necessary processing and memory resources.

One or more embodiments described herein may provide an Integrated Development Environment (IDE) that can provide many of the same capabilities that currently exist for currently existing programming languages. For example, plugins to currently existing IDEs could offer improved functionality and validations when used in accordance with the disclosed principles. In addition, the disclosed principles may provide robust tooling support in the form of a built-in IDE and a Language Server Protocol server that can be used to build generic IDEs.

One or more embodiments described herein may provide an abstract syntax tree (AST) that may be a type-safe in-memory object, used for referencing, fast traversal, and, more significantly, compile-time validation. In accordance with the disclosed principles, use of the AST may provide users (e.g., language engineers) the ability to develop semantic validations for the language. Since validation occurs in the compilation step, the disclosed embodiments will not generate objects if any of the validation checks fail.

An example computer implemented method of operating an integrated development environment (IDE) on a computing device is provided. Features of the IDE are accessible by a user via a user interface running on the computing device and output to a display of the computing device. In one embodiment, the IDE is associated with a query language for developing a query language schema. The method comprises: performing an incremental compilation and linking process on source code of the query language schema, wherein the source code is incrementally compiled and linked to generate runtime objects; and performing a runtime compilation validation process, wherein detected errors in the source code stop the compilation and linking process without generating the runtime objects.

The disclosed principles capitalize on and utilize existing technologies such as e.g., the rules and guidelines within the GraphQL specification and the features of Xtext, an open-source software framework for developing programming languages and domain-specific languages (developed via the Eclipse® Project as part of the Eclipse Modeling Framework Project). Thus, it should be appreciated that the disclosed principles may be referred to herein as "GraphQL-Xtext" for convenience purposes only.

Figure 1:
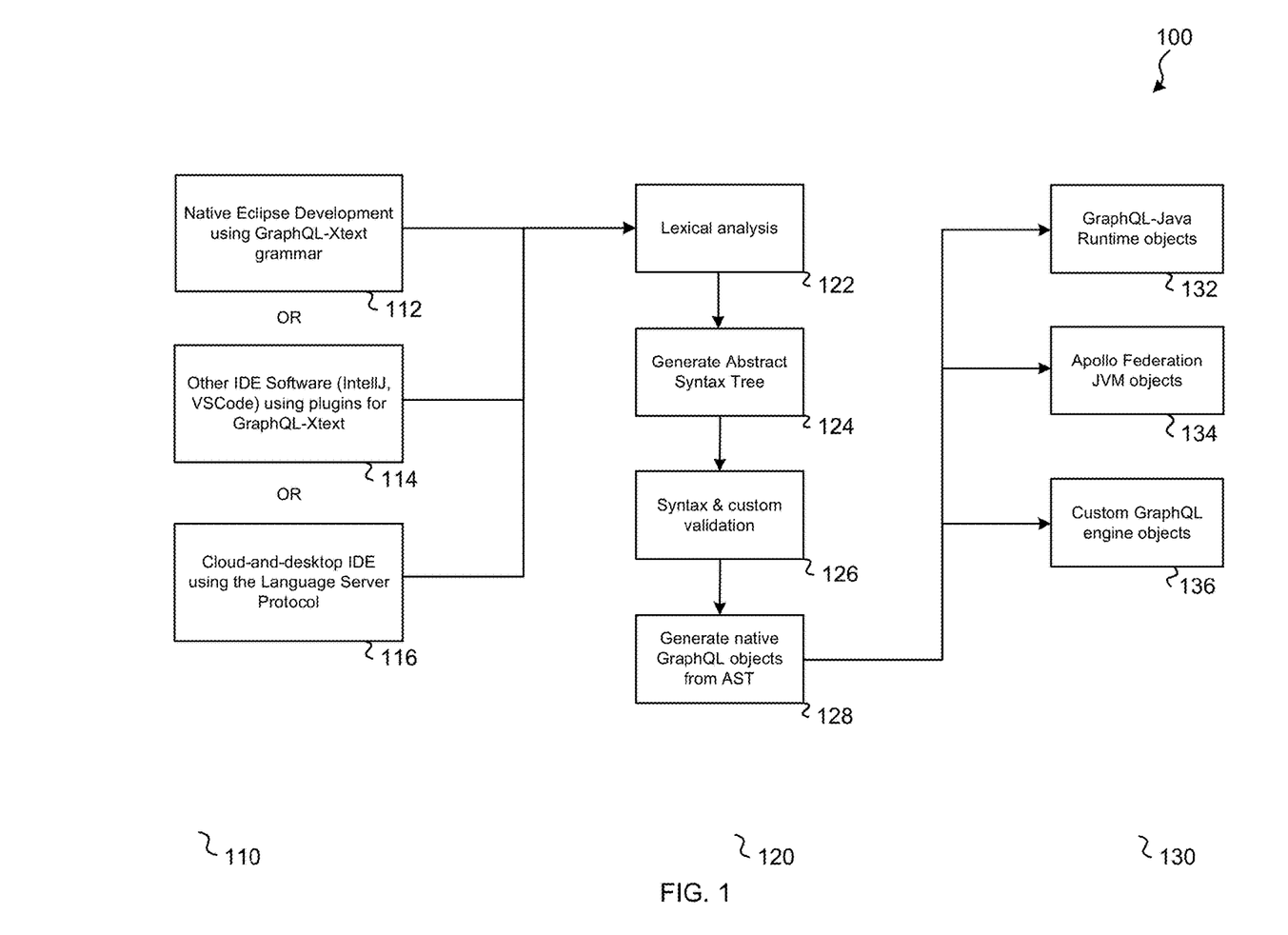
FIG. 1 shows an example process for developing and compiling a GraphQL schema in accordance with an embodiment of the present disclosure.

FIG. 1 illustrates an example process 100 for developing and compiling a GraphQL schema in accordance with the disclosed principles. The process 100 may include a GraphQL schema development process 110 and a GraphQL schema compilation process 120. The process 100 may generate runtime objects 130 as discussed herein.

In one embodiment, the GraphQL schema development process 110 may include a first process 112 based on native Eclipse schema development using customized grammar to implement the features disclosed herein (i.e., GraphQL-Xtext grammar). The GraphQL schema development process 110 may include a second process 114 based on any other available IDE software using plugins for implementing the features disclosed herein (i.e., the features of GraphQL-Xtext). Suitable IDE software may include IntelliJ and or Visual Studio Code (VS Code). The GraphQL schema development process 110 may include a third process 116 based on any available cloud-based and or desktop-based IDE using the well-known and available Language Server Protocol (i.e., an open, JSON-RPC-based protocol for use between source code editors or integrated development environments and servers that provide programming language-specific features). In accordance with the disclosed principles, GraphQL schema development process 110 may provide real-time IDE validation and highlighting and content assist.

In one embodiment, the GraphQL schema compilation process 120 may include a lexical analysis process 122, an abstract syntax tree generation process 124, a syntax and custom validation process 126 and a native GraphQL objects generation process 128. In one embodiment, the lexical analysis process 122 may perform a lexical analysis of the source code developed by the GraphQL schema development process 110. For example, the lexical analysis process 122 may convert the sequence of characters in the GraphQL developed source code into a sequence of tokens as known in the art. In addition, the lexical analysis process 122 may also create a parse tree after the tokenization process. As known in the art, parse trees reflect the syntax of the input language. In one embodiment, an ANTLR-based parse tree may be created using the ANTLR ("ANother Tool for Language Recognition") parser.

In one embodiment, the abstract syntax tree generation process 124 may generate an abstract syntax tree (AST), which is a tree representation of the abstract syntactic structure of the source code. In one embodiment, each node of the abstract syntax tree denotes a construct occurring in the source code. In one embodiment, the abstract syntax tree is generated from the ANTLR parse tree.

In one embodiment, the validation process 126 may be performed using the abstract syntax tree. The disclosed principles, through the generated AST, may provide the ability for language engineers to develop semantic validations for the language. Since validation still occurs in the compilation step, the disclosed principles will not generate objects if any of the validation checks fail. Upon successful completion of the validation process 126, the GraphQL schema compilation process 120 may create GraphQL objects for the schema in the native GraphQL objects generation process 128.

In one embodiment, the disclosed principles may provide incremental compilation and linking. For example, the GraphQL source code may be represented as resources. When initially building the graph, multiple resources are combined together into a single resource set (ResourceSet) to build the runtime graph, while maintaining the structure of the underlying resources that composed that graph. When a resource changes, the disclosed process 100 understands which resource from the resource set changed (i.e., if it was deleted, modified, or is completely new) by comparing the changed resource with the existing resources in the resource set (ResourceSet). Subsequently, the process 100 may calculate deltas, and only modify the components that changed, rather than building the entire graph again from scratch. An example of the incremental compilation and linking performed in accordance with the disclosed principles is discussed in more detail with respect to FIG. 2.

In one embodiment, the generated runtime objects 130 may include GraphQL-Java runtime objects 132, Apollo Federation JVM (Java virtual machine) objects 134 and or custom GraphQL engine objects 136.

Figure 2:
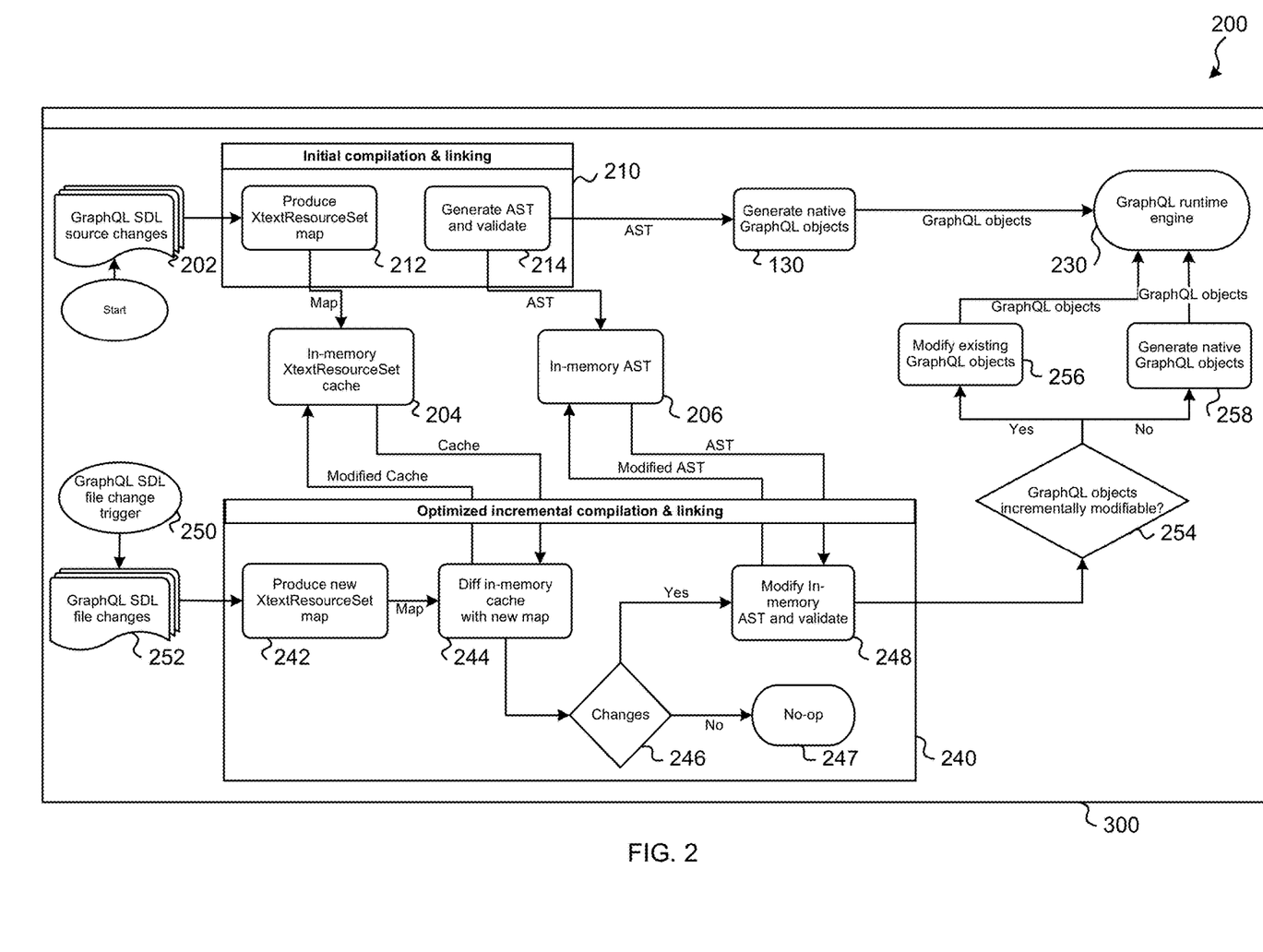
FIG. 2 shows a functional block diagram of an example process for performing incremental GraphQL schema compilation and linking according to an embodiment of the present disclosure.

FIG. 2 illustrates a functional block diagram of an example process 200 for performing incremental GraphQL schema compilation and linking according to an embodiment of the present disclosure. In one embodiment, the process 200 is performed on a computing device 400, which may be a server or other computing device with a processor, memory and one or more input/output devices for carrying out the steps and functions described herein. A suitable computing device 400 is discussed below in more detail with respect to FIG. 4.

As illustrated, the process 200 includes an initial compilation and linking process 210 and an incremental compilation and linking process 240. In the illustrated embodiment, the outputs of the process 200, the native GraphQL objects 130 generated in accordance with the disclosed principles, may be executed by a GraphQL runtime engine 230.

In one embodiment, the initial compilation and linking process 210 may include a first processing block 212 that produces a resource set map (shown as "XtextResourceSet map" in FIG. 2) based on GraphQL SDL (schema definition language) source files 202 developed by a user. The resource set map (XtextResourceSet map) may be used in a second processing block 214, which is used to generate the abstract syntax tree (AST) and perform a validation process as discussed above. In the illustrated example, the resource set map (XtextResourceSet map) is stored in an in-memory cache 204 and the AST is stored in memory 206. The cache 204 and memory 206 may be accessible by the incremental compilation and linking process 240.

In accordance with the disclosed principles, a change (i.e., modification, deletion, or addition) to the GraphQL SDL files 202 will act as a trigger 250 to initiate the incremental compilation and linking process 240. In the illustrated example, changes to the GraphQL SDL files 202 are shown as GraphQL SDL file changes 252, which are input into the incremental compilation and linking process 240.

In one embodiment, a new resource set map (shown as "new XtextResourceSet map" in FIG. 2) based on the GraphQL SDL file changes 252 may be produced at processing block 242 and output to processing block 244. Processing block 244 inputs the initial resource set map (XtextResourceSet map) from the cache 204 and creates a difference (if any) between the maps. The new resource set map (new XtextResourceSet map) may be stored in the cache 206 (shown as "modified cache" in FIG. 2). Processing block 246 determines if there are any changes based on the output from block 244. If no changes are detected (i.e., a "no" at block 246), the incremental compilation and linking process 240 terminates (shown as "no-op" or no operation at block 247 in FIG. 2).

However, if processing block 246 determines that there are changes based on the output from block 244 (i.e., a "yes" at block 246), the incremental compilation and linking process 240 continues at processing block 248. Processing block 248 may retrieve the AST from memory 206, modify the AST to reflect the changes detected by processing block 244 and store the modified AST in the memory 206. In addition, processing block 248 may perform a validation process (similar to process 214) before outputting the modified AST to processing block 254.

Processing block 254 may determine if the existing GraphQL objects are incrementally modifiable (i.e., a change was made in the AST) or not (i.e., a new resource was created). If processing block 254 determines that the existing GraphQL objects are incrementally modifiable (i.e., a "yes"), processing block 256 modifies the existing GraphQL objects, which are then used by the GraphQL runtime engine 230. As such, processing is reduced by only modifying the components that changed. If, however, processing block 254 determines that the existing GraphQL objects are not incrementally modifiable (i.e., a "no"), processing block 258 generates new native GraphQL objects, which are then used by the GraphQL runtime engine 230.

Figure 3:
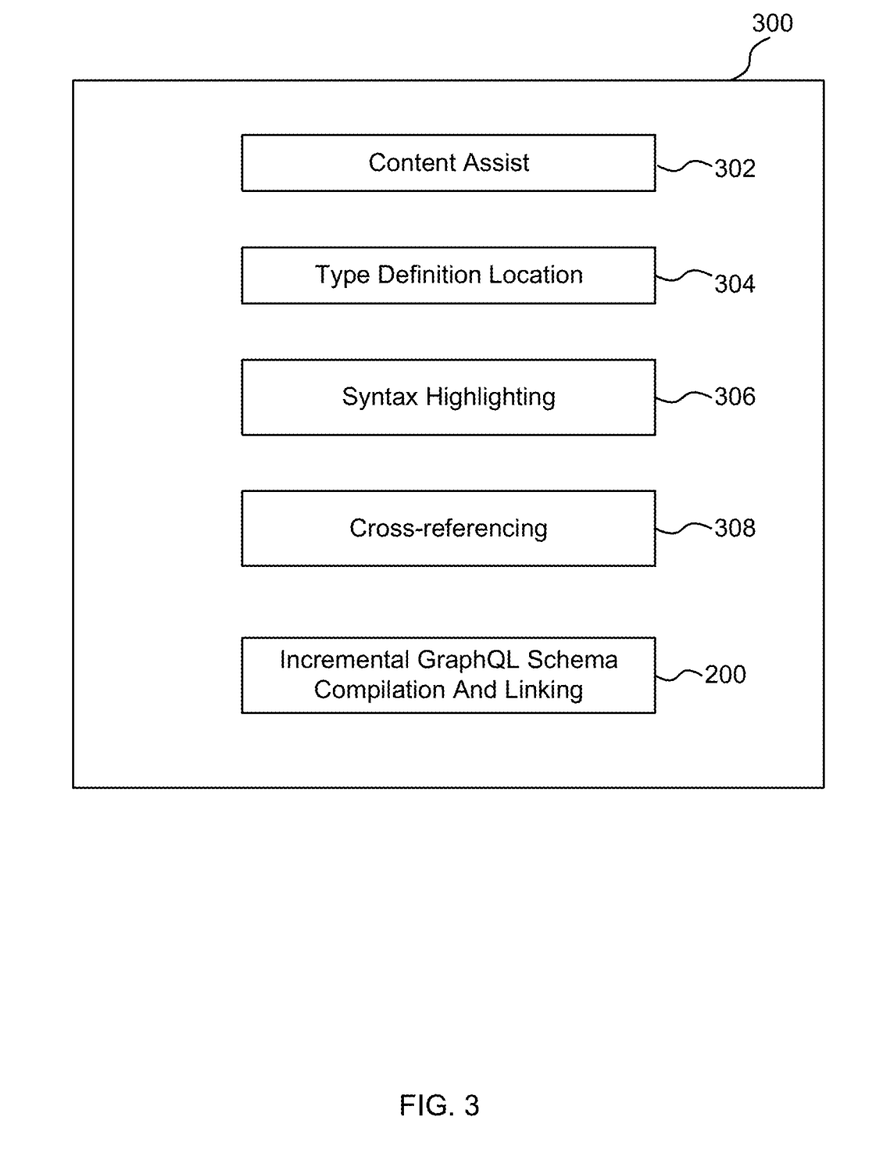
FIG. 3 shows an example integrated development environment (IDE) according to an embodiment of the present disclosure.

FIG. 3 illustrates an example integrated development environment (IDE) 300 in accordance with the disclosed principles. In one embodiment, the IDE 300 may be powered by Eclipse so that the IDE 300 may provide schema developers with classic IDE features and the IDE features disclosed herein. In one or more embodiments, the IDE 300 may comprise at least the following IDE features: content assist 302, type definition location 304, syntax highlighting 306, cross-referencing 308 and incremental GraphQL schema compilation and linking (e.g., process 200). The disclosed embodiments, may build a language server artifact that supports the Language Server Protocol.

Content assist 302 is a process for simplifying coding by a user. Specifically, based on the context of the code being written, content assist 302 may provide the user/developer with a list of accessible keywords according to the programming language specification, variables, methods, data types, etc. In one or more embodiments, content assist 302 may include an autocomplete feature/process, which will complete or suggest text to complete the content being typed by the user. In one embodiment, content assist 302 may also include code snippets, allowing the user to add a coding structure by simply typing a minimal amount of text. For example, a user may type a certain phrase or keyword, oftentimes in quotation marks, which the content assist 302 feature recognizes and replaces with a predefined snippet of code.

In one or more embodiments, type definition location 304 may identify the location inside a resource (e.g., "type"). In one or more embodiments, type definition location may also identify the location of a type definition from other resources (GraphQL files) in the same project. In one or more embodiments, syntax highlighting 306 may include highlighting portions of source code. In one or more embodiments, syntax highlighting 306 may include highlighting different features of the source code in different manners, making it easier for the user to understand the code. For example, strings may be identified by one color, types by another, functions by another and so on. Comments or portions of a document that are not code may not be highlighted at all.

In one or more embodiments, cross-referencing 308 may provide a report or other form of output/display identifying the various relationships between definitions and resources of the schema code being developed. For example, the report or display may identify which program constructs refer to other constructs and where the construct is used.

Figure 4:
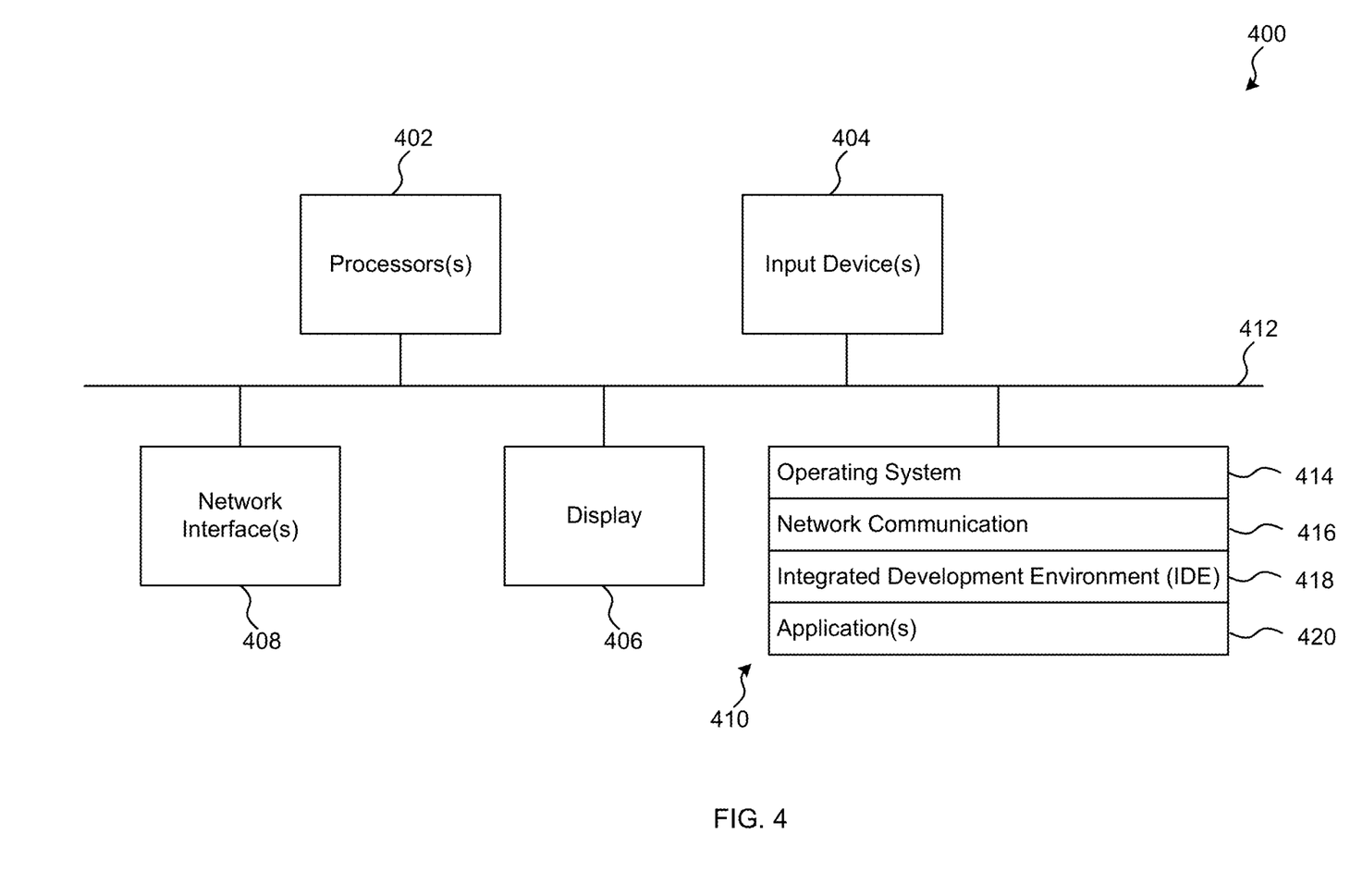
FIG. 4 shows an example computing device that may implement features of the integrated development environment (IDE) disclosed herein.

FIG. 4 is a block diagram of an example computing device 400 that may implement various features and processes as described herein. The computing device 400 may be implemented on any electronic device that runs software applications derived from compiled instructions, including without limitation personal computers, servers, smart phones, media players, electronic tablets, game consoles, email devices, etc. In some implementations, the computing device 400 may include one or more processors 402, one or more input devices 404, one or more display devices 406, one or more network interfaces 408, and one or more non-transitory computer-readable media 410. Each of these components may be coupled by a bus 412.

Display device 406 may be any known display technology, including but not limited to display devices using Liquid Crystal Display (LCD) or Light Emitting Diode (LED) technology. Processor(s) 402 may use any known processor technology, including but not limited to graphics processors and multi-core processors. Input device 404 may be any known input device technology, including but not limited to a keyboard (including a virtual keyboard), mouse, track ball, and touch-sensitive pad or display. Bus 412 may be any known internal or external bus technology, including but not limited to ISA, EISA, PCI, PCI Express, USB, Serial ATA or FireWire. Computer-readable medium 410 may be any medium that participates in providing instructions to processor(s) 402 for execution, including without limitation, non-volatile storage media (e.g., optical disks, magnetic disks, flash drives, etc.), or volatile media (e.g., SDRAM, ROM, etc.).

Computer-readable medium 410 may include various instructions 414 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 404; sending output to display device 406; keeping track of files and directories on non-transitory computer-readable medium 410; controlling peripheral devices (e.g., disk drives, printers, etc.) which can be controlled directly or through an I/O controller; and managing traffic on bus 412. Network communications instructions 416 may establish and maintain network connections (e.g., software for implementing communication protocols, such as TCP/IP, HTTP, Ethernet, telephony, etc.).

Integrated development environment (IDE) instructions 418 may include instructions that implement the IDE and other features described herein. Application(s) 420 may be an application that uses or implements the processes described herein and/or other processes. The processes may also be implemented in operating system 414.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 5:
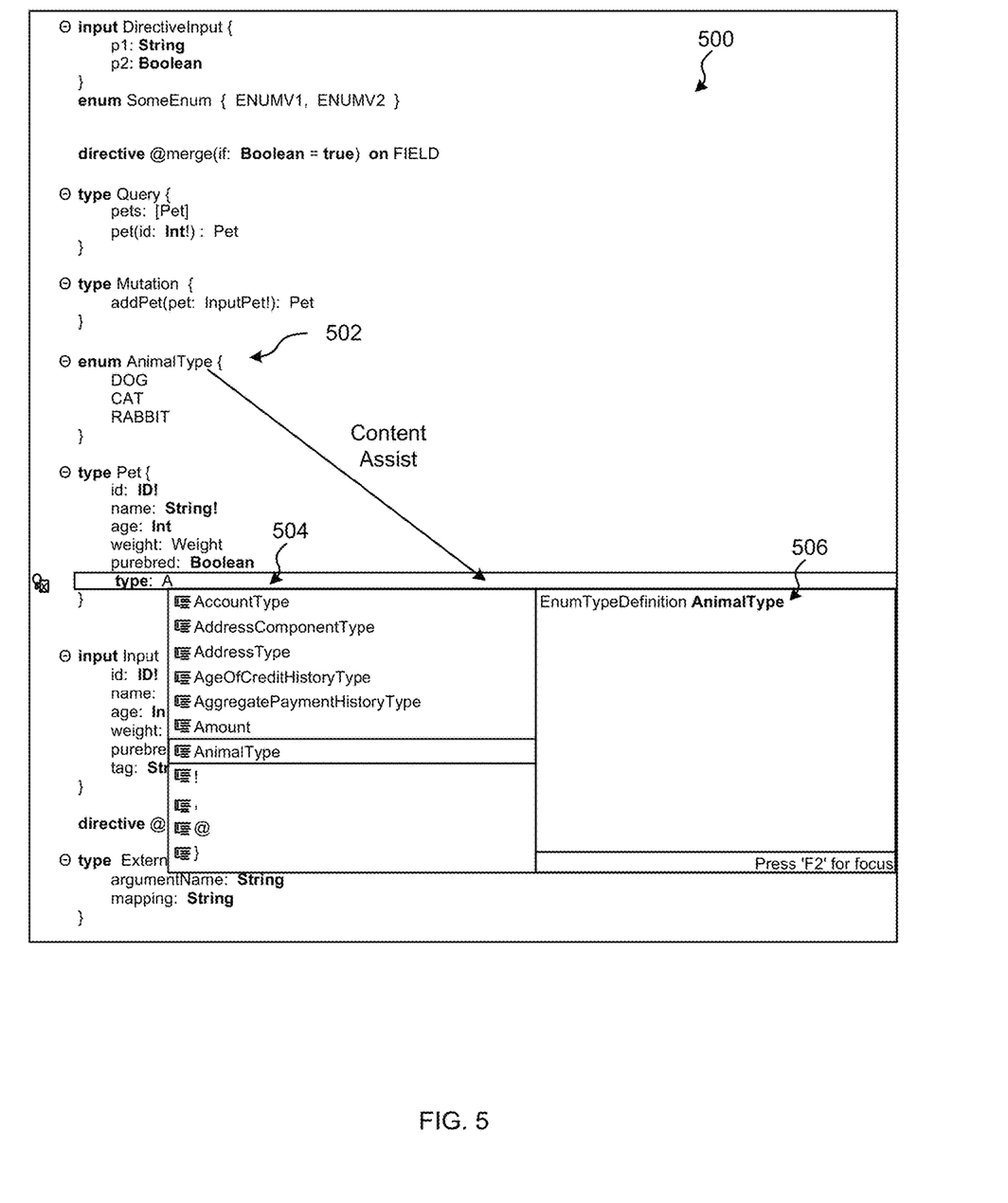
FIG. 5 illustrates an example of a user interface illustrating a content assist process in accordance with the disclosed principles.

FIG. 5 illustrates an example of a user interface 500 illustrating the content assist feature in accordance with the disclosed principles. In the illustrated example, content assist was used to help the user code an "AnimalType" enumeration, enum 502. During the coding process, as the user typed "enum a", a listing 504 of enumerations that could complete what the user was typing may be presented on the user interface 500. In the illustrated example, the listing 504 includes enumerations "AccountType", "AddressComponentType", "AddressType", "AgeOfCreditHistoryType", "AggregatePaymentHistoryType", "Amount", and "Animal Type". In one or more embodiments, the user may select "AnimalType" from the listing 504. In one or more embodiments, an autocomplete feature/process may be used to enter "AnimalType" as the user types more letters (e.g., when the user enters "an", "AnimalType" may be filled in automatically).

Figure 6:
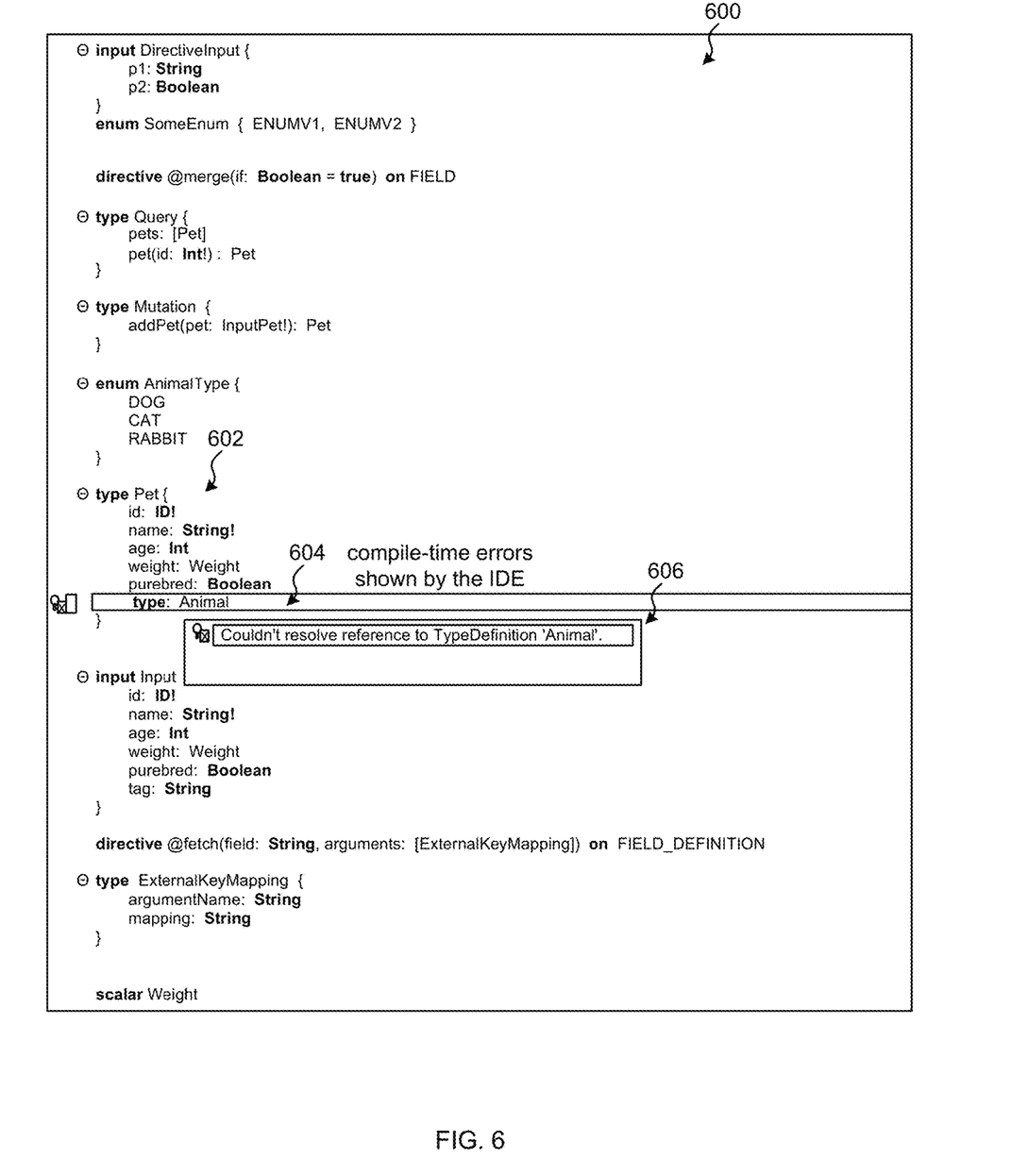
FIG. 6 illustrates an example of a user interface that may output compile time errors to a user in accordance with the disclosed principles.

FIG. 6 illustrates an example of a user interface 600 that may output compile time errors to a user in accordance with the disclosed principles. As shown in the illustrated example, the user has coded a "Pet" type 602. Within the example "Pet" type 602, the user has included an "Animal" type 604. In the illustrated example, "Animal" is not a valid type. Accordingly, when the schema is compiled, the compilation feature disclosed herein stops the compilation and displays a real-time error message 606 identifying the compilation error. In the illustrated example, the message 606 includes the text "Couldn't resolve reference to TypeDefinition 'Animal'." It should be appreciated that other compile-time errors could be displayed on the interface 600.

It is known in the art that other schema development systems are available. Some examples include GraphQL-Java and Apollo Federation. These systems, however, do not provide the features or benefits associated with the disclosed principles. For example, GraphQL-Java provides a simple parsing mechanism using the ANTLR parser generator. GraphQL-Java parses a GraphQL schema against grammar (also defined in GraphQL-Java) and produces an executable artifact that can be used at runtime. However, GraphQL-Java does not provide semantic validation or tooling support for editing and managing GraphQL schemas. Thus, the majority of tooling support is created by third-party developers. GraphQL-Java parser also lacks cross-referencing. Instead, it relies on a runtime symbol table, created after the parsing step, to cross-reference types and perform a majority of the validations defined by the GraphQL specification. The disclosed principles, on the other hand, are designed to provide cross-referencing and all validations (even custom validations) can be performed during the parsing step.

Apollo Federation provides a solution for parsing and validating schemas, as well as tooling solutions for graph editing and management. Apollo defined its own specification (i.e., the Federation specification) that deviates from the official GraphQL specification. For example, in the GraphQL specification, it is not possible to extend an object type that does not exist in the graph. At compile time, this should result in an error that should be fixed before an artifact is generated. In the Federation specification, however, a user is allowed to extend an object type that does not exist in the graph, because it is assumed that the object type will be provided at runtime. Thus, the schema will be valid at compile-time, but will fail at runtime if the extended type still does not exist. As noted above, this is not desirable and raises other concerns.

For example, validation and schema analysis is always deferred until runtime (similar to GraphQL-Java), which removes the capability to perform crucial static analysis checks of the schema as it is being built. Generated artifacts have a high possibility of being invalid due to checks that the Apollo parser cannot and do not perform at compile-time. Moreover, the deviation from the official GraphQL specification means that Federation schemas cannot be used outside the context of Federation and its tools, which reduces the general-purpose capability of the schema.

The disclosed principle, may provide GraphQL schema parsing that is built for the Java Virtual Machine (JVM). Apart from Java, the disclosed principles (GraphQL-Xtext) may support all programming languages that run on the JVM such as Scala, Kotlin, and Clojure, all with a single executable.

Moreover, the disclosed principles may also provide the following capabilities that no other library can do today: (1) content assist and static analysis with additional semantic, compile-time validation rules that can be built into the parsing mechanism without the need for runtime validation tooling; and (2) platform-agnostic tooling (that is, generated Language Server Protocol (LSP) artifacts can be used to build capable generic IDEs in websites, or plugins to already existing, popular IDEs).

The generation of the abstract syntax tree (AST) is also unique and an improvement over existing technology. Small changes in a schema can be incrementally compiled and linked to produce the following benefits: (1) reduced computational impact due to not needing to process the entire schema on every change, which results in a reduction in processing resources; (2) reduction in memory resources due to only changing the minimum required set of nodes that changed; and (3) reduction of objects that need to be garbage collected when the schema changes, resulting in a reduction in garbage collection pressure and the processing resources required to perform garbage collection.

Another technical novelty of the disclosed principles is in the support of custom validations in the LSP server and an Eclipse IDE. As mentioned above, the existing solutions rely on run-time validations for errors and warnings that cannot be checked through lexical analysis. However, the disclosed principles may provide real-time feedback while the schema is being built by running the custom validations as the user is typing.

Thus, the disclosed principles result in a major improvement in the technological art as they improve the functioning of a computerized system, use compact storage and reduced processing resources for the reasons discussed above. Moreover, the disclosed principles provide an improvement to the technology and technical field of GraphQL and other schema development systems and environments.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method of operating an integrated development environment (IDE) on a computing device, features of the IDE being accessible by a user via a user interface running on the computing device and output to a display of the computing device, the IDE being associated with a query language and for developing a query language schema, said method comprising:
   producing and storing, in an in-memory cache, a resource set map based on a source code of the query language schema;
   generating and storing, in a memory, an abstract syntax tree (AST) to represent a structure of a syntax of the source code by using the resource set map;
   initiating an incremental compilation and linking process triggered by a change to the source code;
   performing the incremental compilation and linking process on the source code of the query language schema, wherein the source code is incrementally compiled and linked to generate runtime objects, by:
      producing a new resource set map based on the change to the source code;
      creating a difference between the resource set map and the new resource set map;
      retrieving the AST stored in the memory;
      modifying the AST to reflect the change based on the difference; and
   performing a runtime validation process for the modified AST during the incremental compilation and linking process before generating the runtime objects, the runtime validation process comprising detecting errors of presence of object types assumed by a compiler to be provided during runtime, wherein the detection of the errors stops the incremental compilation and linking process without generating the runtime objects.

2. The method of claim 1, wherein the runtime validation process further comprises:
   inputting the source code;
   performing a lexical analysis process on the source code;
   creating a parse tree on the output from the lexical analysis process;
   performing an AST generation process to generate the AST; and
   performing a validation process using the AST.

3. The method of claim 2, wherein the lexical analysis process generates a sequence of tokens from characters within the source code.

4. The method of claim 1, wherein the incremental compilation and linking process comprises:
   performing a first compilation process using source files containing first source code of the query language schema to generate first runtime objects; and
   performing a second compilation process using one or more changed source files containing second source code of the query language schema to generate one or more second runtime objects.

5. The method of claim 4, wherein the first compilation process further comprises:
   creating a first resource set map and a first AST;
   storing the first resource set map in the memory; and
   storing the first AST in another memory.

6. The method of claim 4, wherein the first compilation process further comprises creating a first resource set map and a first AST and the second compilation process further comprises:
   inputting the one or more changed source files;
   creating a second resource set map;
   creating a first difference between the first resource set map and the second resource set map;

using the first difference between the first resource set map and second resource set map to create a second modified AST; and compiling the second source code based on the second modified AST.

7. The method of claim 6, wherein the second compilation process further comprises:

modifying one or more first runtime objects when the first difference indicates that the second source code comprises a change to the first source code;

creating one or more second runtime objects when the first difference indicates that the second source code comprises a new resource; and modifying the one or more first runtime objects when the first difference indicates that the second source code no longer comprises a resource from the first source code.

8. The method of claim 1, further comprising:

performing content assist as the user is updating a source code file;

performing type definition location;

performing syntax highlighting; and performing cross-referencing.

9. The method of claim 8, wherein performing the content assist further comprises performing an autocomplete process to automatically complete an item being updated by the user as the user is updating the source code.

10. The method of claim 1, wherein the runtime validation process outputs an error message to the user interface when an error in the source code is detected.

11. A system for operating an integrated development environment (IDE), said system comprising:

a computing device, features of the IDE being accessible by a user via a user interface running on the computing device and output to a display of the computing device, the IDE being associated with a query language and for developing a query language schema, said computing device being configured to:

produce and store, in an in-memory cache, a resource set map based on a source code of the query language schema;

generate and store, in a memory, an abstract syntax tree (AST) to represent a structure of a syntax of the source code by using the resource set map;

initiate an incremental compilation and linking process triggered by a change to the source code;

perform the incremental compilation and linking process on source code of the query language schema, wherein the source code is incrementally compiled and linked to generate runtime objects, by:

produce a new resource set map based on the change to the source code;

create a difference between the resource set map and the new resource set map;

retrieve the AST stored in the memory;

modify the AST to reflect the change based on the difference; and perform a runtime validation process for the modified AST during the incremental compilation and linking process before generating the runtime objects, the runtime validation process comprising detecting errors of presence of object types assumed by a compiler to be provided during runtime, wherein the detection of the errors in stops the incremental compilation and linking process without generating the runtime objects.

12. The system of claim 11, wherein the runtime validation process further comprises:

inputting the source code;

performing a lexical analysis process on the source code;

creating a parse tree on the output from the lexical analysis process;

performing an AST generation process to generate the AST; and performing a validation process using the AST.

13. The system of claim 12, wherein the lexical analysis process generates a sequence of tokens from characters within the source code.

14. The system of claim 11, wherein the incremental compilation and linking process comprises:

performing a first compilation process using source files containing first source code of the query language schema to generate first runtime objects; and performing a second compilation process using one or more changed source files containing second source code of the query language schema to generate one or more second runtime objects.

15. The system of claim 14, wherein the first compilation process further comprises:

creating a first resource set map and a first AST;

storing the first resource set map in the memory; and storing the first AST in another memory.

16. The system of claim 14, wherein the first compilation process further comprises creating a first resource set map and a first AST and the second compilation process further comprises:

inputting the one or more changed source files;

creating a second resource set map;

creating a first difference between the first resource set map and second resource set map;

using the first difference between the first resource set map and the second resource set map to create a second modified AST; and compiling the second source code based on the second modified AST.

17. The system of claim 16, wherein the second compilation process further comprises:

modifying one or more first runtime objects when the first difference indicates that the second source code comprises a change to the first source code;

creating one or more second runtime objects when the first difference indicates that the second source code comprises a new resource; and modifying the one or more first runtime objects when the first difference indicates that the second source code no longer comprises a resource from the first source code.

18. The system of claim 11, wherein the computing device is further configured to:

perform content assist as the user is updating a source code file;

perform type definition location;

perform syntax highlighting; and perform cross-referencing.

19. The system of claim 18, wherein performing the content assist further comprises performing an autocomplete process to automatically complete an item being updated by the user as the user is updating the source code.

20. The system of claim 11, wherein the runtime validation process outputs an error message to the user interface when an error in the source code is detected.

* * * * *